(12) United States Patent
Suzuki

(10) Patent No.: US 7,027,541 B2
(45) Date of Patent: Apr. 11, 2006

(54) FRAME SYNCHRONIZING SIGNAL DETECTING METHOD FOR REDUCING OCCURRENCE OF ERROR SYNCHRONIZATION BEFORE LINK OF FRAME SYNCHRONIZING SIGNAL IS ESTABLISHED

(75) Inventor: Katsuji Suzuki, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 754 days.

(21) Appl. No.: 10/068,240

(22) Filed: Feb. 5, 2002

(65) Prior Publication Data

US 2002/0110208 A1     Aug. 15, 2002

(30) Foreign Application Priority Data

Feb. 9, 2001     (JP) ............................. 2001-033992

(51) Int. Cl.
*H04L 7/00*     (2006.01)

(52) U.S. Cl. .................................. 375/354

(58) Field of Classification Search ............. 375/224, 375/228, 259, 354, 357, 360, 377, 295, 316; 370/229, 509, 510, 512, 503, 480, 464

See application file for complete search history.

(56) References Cited

U.S. PATENT DOCUMENTS 4,356,566 A     10/1982     Wada et al.
4,903,225 A *   2/1990     Brost .................... 708/422
6,359,933 B1 *  3/2002     Aslanis et al. ........... 375/260
6,748,036 B1 *  6/2004     Tsurumaru .............. 375/344

FOREIGN PATENT DOCUMENTS

JP     HEI 5-207003     8/1993

* cited by examiner

*Primary Examiner*—Mohammed Ghayour
*Assistant Examiner*—Pankaj Kumar
(74) *Attorney, Agent, or Firm*—Brinks Hofer Gilson & Lione

(57) ABSTRACT

A frame synchronizing signal detecting method according to the invention is used in a data multiplexing transmitter-receiver which is provided with a transmitter-receiver that transmits and receives at least a radio-frequency signal, a modulator-demodulator that converts the radio-frequency signal to a baseband signal and vice versa and a baseband signal processor that processes the baseband signal and in which the baseband signal processor is provided with a frame synchronizing signal detector, and when a frame synchronizing signal included in received data is detected, the frame synchronizing signal detector sets the detection precision of the frame synchronizing signal before a frame synchronization link is established to a value higher than regular detection precision and sets the detection precision of the frame synchronizing signal after the frame synchronization link is established to a value lower than the regular detection precision.

1 Claim, 2 Drawing Sheets

FRAME SYNCHRONIZING SIGNAL DETECTING METHOD FOR REDUCING OCCURRENCE OF ERROR SYNCHRONIZATION BEFORE LINK OF FRAME SYNCHRONIZING SIGNAL IS ESTABLISHED

This application claims the benefit of priority to Japanese Patent Application No. 2001-033992, herein incorporated by reference.

BACKGROUND OF THE INVENTION

1. Field of the Invention

The present invention relates to a frame synchronizing signal (a unique word) detecting method, particularly relates to a frame synchronizing signal detecting method used for a data multiplexing transmitter-receiver of achieving the stable establishment of a link by enhancing the detection precision of a frame synchronizing signal before the link of a frame synchronizing signal is established and of preventing non-detection due to noise and disturbance by lowering the detection precision of a frame synchronizing signal after the link of a frame synchronizing signal is established.

2. Description of the Related Art

Generally, a frame synchronizing signal (also called a unique word or a flag) having a specific bit pattern is added to the head of data included in each data packet, when a data multiplexing transmitter-receiver at the transmitting end transmits data, it transmits the data of which a frame synchronizing signal is added to the head of the data string, when another data multiplexing transmitter-receiver at the receiving end receives the transmitted data, it detects the frame synchronizing signal added to the data and frame synchronization with the data multiplexing transmitter-receiver at the transmitting end is achieved using the detected frame synchronizing signal.

A frame synchronizing signal is normally detected by a frame synchronizing signal detector provided to a baseband signal processor in a data multiplexing transmitter-receiver. In this case, when the frame synchronizing signal detector receives data, it searches a frame synchronizing signal having a specific bit pattern in the received data, when the added position of the frame synchronizing signal in a frame is verified by the search, a frame synchronization link is established and afterward, the frame synchronizing signal is extracted based upon the verified added position of the frame synchronizing signal.

FIG. 2 is a block diagram showing one example of the configuration of the main part of a known data multiplexing transmitter-receiver.

As shown in FIG. 2, a data multiplexing transmitter-receiver 20 is provided with an antenna 21, a duplexer 22 formed by a change-over switch, a radio-frequency (RF) transmitter-receiver 23 provided with a radio-frequency (RF) signal transmitter $23_1$ and a radio-frequency (RF) signal receiver $23_2$, a modulator-demodulator (MODEM) 24 provided with a modulating circuit (MOD) $24_1$ that converts a baseband signal to a radio-frequency signal and a demodulating circuit (DEM) $24_2$ that converts a radio-frequency signal to a baseband signal and a frame synchronizing signal detector $25_1$, includes a baseband signal processor 25 that processes a baseband signal, a control panel 26 and a microcomputer and also includes a control unit (CPU) 27 that generally controls the data multiplexing transmitter-receiver 20.

The common terminal of the duplexer 22 is connected to the antenna 21, one selection terminal is connected to the output terminal of the radio-frequency signal transmitter $23_1$, the other selection terminal is connected to the input terminal of the radio-frequency signal receiver $23_2$ and the control terminal is connected to the control unit 27. The input terminal of the modulating circuit $24_1$ is connected to the output terminal of the baseband signal processor 25 and the output terminal is connected to the input terminal of the radio-frequency signal transmitter $23_1$. The input terminal of the demodulating circuit $24_2$ is connected to the output terminal of the radio-frequency signal receiver $23_2$ and the output terminal is connected to the input terminal of the baseband signal processor 25. The baseband signal processor 25 is connected to the control unit 27 and the control panel 26 is also connected to the control unit 27.

The data multiplexing transmitter-receiver 20 having the configuration described above operates as follows.

Data transmission between the data multiplexing transmitter-receiver 20 and a data multiplexing transmitter-receiver on the side of a counterpart (not shown) is set so that the transmitting timing of transmit data and the receiving timing of receive data alternately present themselves by time division multiplexing.

When the data multiplexing transmitter-receiver 20 comes into data transmitting timing, the control unit 27 instructs the baseband signal processor 25 to generate transmit data and switches the duplexer 22 to the side of the radio-frequency signal transmitter $23_1$. At this time, the baseband signal processor 25 generates packet data of a determined format and supplies the packet data to the modulating circuit $24_1$. The modulating circuit $24_1$ modulates the supplied packet data to a transmitting radio-frequency signal and supplies it to the radio-frequency signal transmitter $23_1$. The radio-frequency signal transmitter $23_1$ amplifies the supplied transmitting radio-frequency signal so that the level reaches a transmission level, supplies it to the antenna 21 via the already switched duplexer 22 and transmits it to the data multiplexing transmitter-receiver on the side of the counterpart in a transmitting timing as a radio signal.

In the meantime, when the data multiplexing transmitter-receiver 20 comes into data receiving timing, the control unit 27 instructs the baseband signal processor 25 to prepare for the processing of receive data and switches the duplexer 22 to the side of the radio-frequency signal receiver $23_2$. At this time, when a radio signal including receive data is incoming to the antenna 21, the radio-frequency signal receiver $23_2$ receives the radio signal as a radio-frequency signal for receiving from the antenna 21 via the already switched duplexer 22, amplifies the radio-frequency signal for receiving to a predetermined level and supplies it to the demodulating circuit $24_2$. The demodulating circuit $24_2$ demodulates the supplied radio-frequency signal for receiving to a baseband signal and generates packet data. The packet data is supplied to the baseband signal processor 25 and after it is checked whether the packet data is normal receive data or not by the baseband signal processor 25, data is extracted and is supplied to the control unit 27 and others. When the frame synchronizing signal detector $25_1$ in the baseband signal processor 25 receives data, it searches a frame synchronizing signal having a specific bit pattern in the received data as described above, when the added position of the frame synchronizing signal in the data is verified in the search, a frame synchronization link is established, afterward, the frame synchronizing signal is extracted based upon the verified added position of the frame synchronizing signal and the extracted frame synchronizing signal is supplied to the control unit 27 and others.

Afterward, when the data multiplexing transmitter-receiver 20 comes into data transmitting timing, the same processing as that at the transmitting timing is executed again and afterward, receiving data and transmitting data are also repeatedly executed.

The known data multiplexing transmitter-receiver 20 sets the detection precision of a frame synchronizing signal to detection precision experientially determined (regular detection precision) when the frame synchronizing signal is detected by the frame synchronizing signal detector $25_1$ and establishes a frame synchronizing signal link depending upon the set regular detection precision.

The reason why the detection precision of a frame synchronizing signal is set to such regular detection precision is as follows. If the detection precision of a frame synchronizing signal is set so that it is higher than the regular detection precision, there is an advantage in that error synchronization is reduced and the establishment of a stable link can be achieved before a frame synchronizing signal link is established (a link is tried), however, there is a disadvantage in that after a frame synchronizing signal link is established, non-detection due to slight noise superimposed on data and disturbance is often caused and the detection rate of a frame synchronizing signal is deteriorated. In the meantime, if the detection precision of a frame synchronizing signal is set so that it is lower than the regular detection precision, there is an advantage in that the occurrence of non-detection due to slight noise superimposed on data and disturbance is reduced and the detection rate of a frame synchronizing signal is enhanced after a frame synchronizing signal link is established, however, there is a disadvantage in that before a frame synchronizing signal link is established, error synchronization is frequently caused and it takes a long time to establish a link.

The regular detection precision used in the known data multiplexing transmitter-receiver 20 when a frame synchronizing signal is detected is acquired as a result by relieving the disadvantage in the case where the detection precision of a frame synchronizing signal is set so that it is higher than the regular detection precision and the disadvantage in the case where the detection precision of a frame synchronizing signal is set so that it is lower than the regular detection precision, however, these disadvantages are not completely solved.

SUMMARY OF THE INVENTION

The invention is made in view of such a technical background and the object is to provide a frame synchronizing signal detecting method of reducing error synchronization before a frame synchronizing signal link is established and of enhancing the detection rate of a frame synchronizing signal after a frame synchronizing signal link is established.

To achieve the object, the frame synchronizing signal detecting method according to the invention is characterized in that a transmitter-receiver that transmits and receives a radio-frequency signal, a modulator-demodulator that converts a radio-frequency signal to a baseband signal and converts vice versa and a baseband signal processor that processes a baseband signal are at least provided, the baseband signal processor is provided with a frame synchronizing signal detector and when a frame synchronizing signal included in received data is detected the frame synchronizing signal detector sets the detection precision of a frame synchronizing signal before a frame synchronization link is established to a high value and sets the detection precision of a frame synchronizing signal after the frame synchronization link is established to a lower value than the abovementioned detection precision.

According to the means, the occurrence of error synchronization is reduced and the establishment of a stable link can be achieved by setting the detection precision of a frame synchronizing signal before a frame synchronization link is established so that it is high and non-detection due to slight noise superimposed on data and disturbance is reduced and the detection rate of a frame synchronizing signal can be enhanced by setting the detection precision of a frame synchronizing signal after a frame synchronization link is established so that it is low.

As an example suitable for the means, the frame synchronizing signal detector is provided with a shift register that temporarily stores received data, a frame synchronizing signal storage that stores a frame synchronizing signal, a comparator that detects coincidence of a frame synchronizing signal extracted from the shift register and the frame synchronizing signal output from the frame synchronizing signal storage, a counter that counts the coincidence output of the comparator, a detection precision setting device that sets the detection precision of the frame synchronizing signal to a high value or a low value according to the value of the counter so that it is high or low and a frame synchronizing signal detection signal output device that detects the frame synchronizing signal from the received data with the detection precision set by the detection precision setting device.

According to the configuration, if a function produced by the abovementioned means is achieved by the frame synchronizing signal detector, the frame synchronizing signal detector can have a relatively simple configuration and as a result, the manufacturing cost and the occupied volume are not greatly increased.

DETAILED DESCRIPTION OF THE PREFERRED EMBODIMENT

Figure 1:
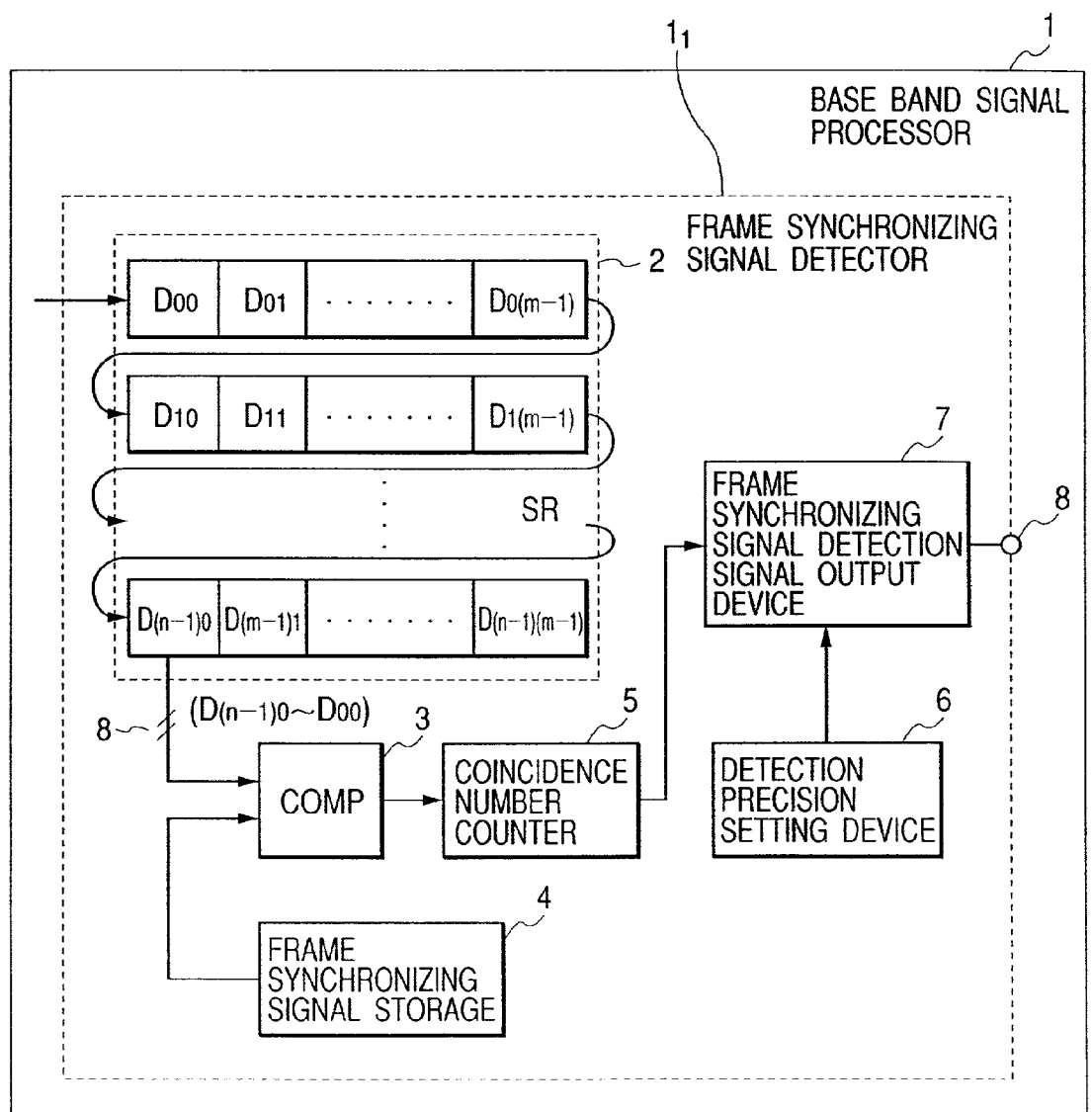
FIG. 1 shows one embodiment of a frame synchronizing signal detecting method according to the invention and is a block diagram showing the configuration of the main part of a frame synchronizing signal detector in a baseband signal processor of a data multiplexing transmitter-receiver.

Referring to the drawings, an embodiment of the invention will be described below.

FIG. 1 shows one embodiment of a frame synchronizing signal detecting method according to the invention and is a block diagram showing the configuration of the main part of a frame synchronizing signal detector in a baseband signal processor of a data multiplexing transmitter-receiver.

Figure 2:
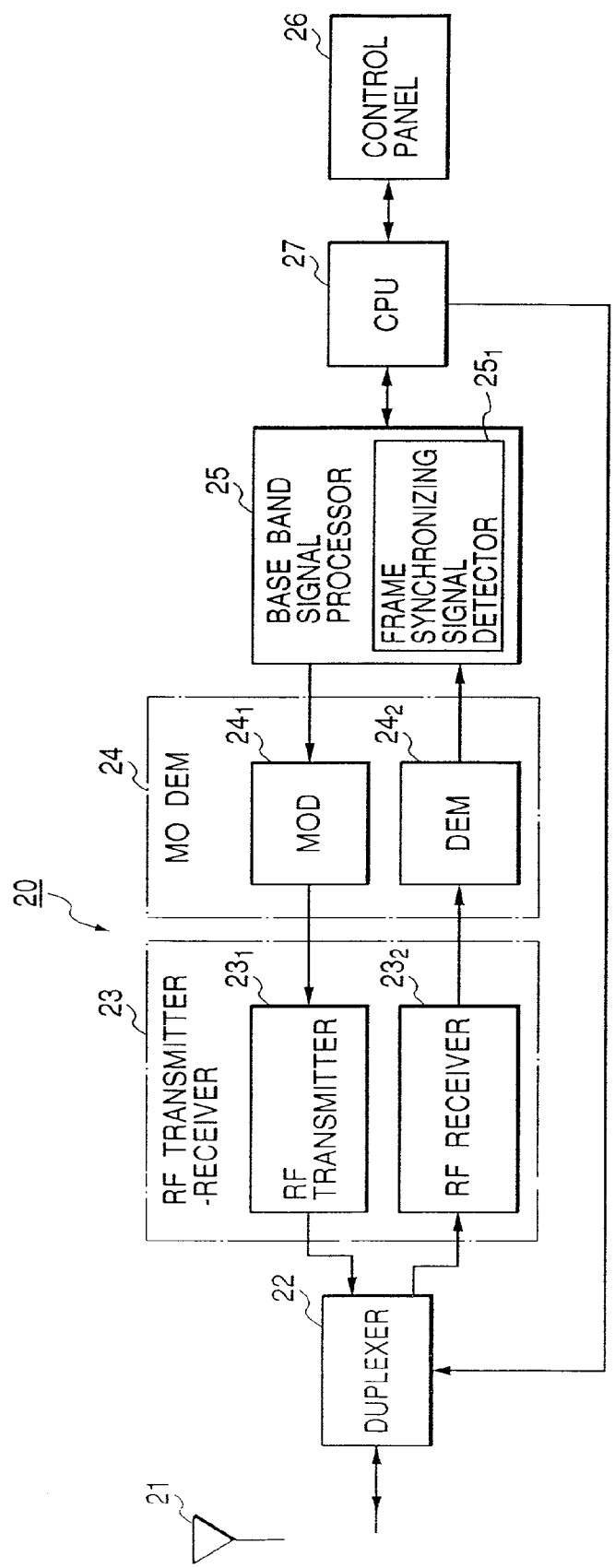
FIG. 2 is a block diagram showing one example of the configuration of the main part of a known data multiplexing transmitter-receiver.

As shown in FIG. 1, as components except the baseband signal processor in the data multiplexing transmitter-receiver are substantially the same as those in a known data multiplexing transmitter-receiver shown in FIG. 2, they are not shown in FIG. 1.

As shown in FIG. 1, the frame synchronizing signal detector $1_1$ in the baseband signal processor 1 includes a shift register (SR) 2 composed of m (an integer) rows the number of which is equal to a sampling rate (the number of data shift clocks) and n (an integer) columns for sequentially shifting received data, a comparator (COMP) 3 that detects the number of coincidence between a bit input from the shift register 2 and a bit input from a frame synchronizing signal storage 4 described later and generates incidence output every time, the frame synchronizing signal storage 4 that stores a frame synchronizing signal having a specific bit pattern, for example '01111110', a coincidence number counter 5 that counts the number of coincidence output supplied from the comparator 3 for every frame, a detection precision setting device 6 that selects high detection precision or low detection precision according to the number of counts supplied from the coincidence number counter 5 and sets the detection precision of a frame synchronizing signal output from a frame synchronizing signal detection signal output device 7 described later and the frame synchronizing signal detection signal output device 7 that detects a frame synchronizing signal in the received data according to detection precision setting information supplied from the detection precision setting device 6 and supplies the detected frame synchronizing signal to a frame synchronizing signal detection signal output terminal 8. Bit data $D_{00}$ and $D_{(n-1)0}$ in "$D_{00}, D_{01}, ---, D_{0(m-1)}, D_{10}, D_{11}, ---, D_{1(m-1)}, ---, D_{(n-1)0}, D_{(n-1)1}, ---, D_{(n-1)(m-1)}$" show data bits included in each row of the shift register 2.

In the frame synchronizing signal detector $1_1$, the input terminal of the shift register 2 is connected to the output terminal of a demodulating circuit located before and not shown in FIG. 1 and the output terminal is connected to a first input terminal of the comparator 3. A second input terminal of the comparator 3 is connected to the output terminal of the frame synchronizing signal storage 4 and the output terminal is connected to the input terminal of the coincidence number counter 5. The output terminal of the coincidence number counter 5 is connected to the input terminal of the frame synchronizing signal detection signal output device 7. The control terminal of the frame synchronizing signal detection signal output device 7 is connected to the output terminal of the detection precision setting device 6 and the output terminal of the coincidence number counter 5 and the output terminal is connected to the frame synchronizing signal detection signal output terminal 8.

The frame synchronizing signal detector $1_1$ having the abovementioned configuration is operated as follows.

First, the operation in link trial, that is, the operation until a frame synchronization link is established will be described.

When received data is supplied from the demodulating circuit located before to the frame synchronizing signal detector $1_1$, the received data is sampled at a rate equivalent to m times of the transfer rate of the received data by a shift clock signal and is sequentially accommodated in the shift register 2. At this time, the comparator 3 sequentially compares a bit pattern sequentially output from the output terminal of the shift register 2 and the specific bit pattern of the frame synchronizing signal sequentially output from the frame synchronizing signal storage 4 for every bit, generates one polarity of, for example, positive coincidence output when the bits are coincident in the comparison of the bits and generates the other polarity of, for example, inequality output at a zero level when the bits are not coincident. Next, the coincidence number counter 5 counts the number of coincident output for every frame of the received data and supplies the number of counts to the frame synchronizing signal detection signal output device 7. As the added position of a frame synchronizing signal is not verified before a frame synchronization link is established, the detection precision setting device 6 supplies a signal set so that a frame synchronizing signal is detected with detection precision higher than regular detection precision to the frame synchronizing signal detection signal output device 7. At this time, in the frame synchronizing signal detection signal output device 7, the detection precision of a frame synchronizing signal is set to detection precision higher than the regular detection precision, a frame synchronizing signal in the received data is detected with the higher detection precision, as a result, the added position of the frame synchronizing signal is verified and a frame synchronization link is established.

Next, the operation after the frame synchronization link is established will be described.

This case is identical to the abovementioned case in that when received data is supplied from the demodulating circuit located before to the frame synchronizing signal detector $1_1$, the received data is sampled at a rate equivalent to m times of the transfer rate of the received data by a shift clock signal and is sequentially accommodated in the shift register 2. At this time, as a frame synchronization link is established and the added position of a frame synchronizing signal can be verified, the comparator 3 sequentially compares a bit pattern from the output terminal of the shift register 2 and the specific bit pattern sequentially output from the frame synchronizing signal storage 4 for every bit at timing at which a data bit in the verified added position of the frame synchronizing signal is sequentially output from the output terminal of the shift register 2, as in the abovementioned case, when the bits are coincident in the comparison of the bits, the comparator generates one polarity of, for example positive coincidence output and when the bits are not coincident, the comparator generates the other polarity of, for example, inequality output at a zero level. Next, the coincidence number counter 5 counts the number of coincident output for every frame of the received data and supplies the number of counts to the detection precision setting device 6. The detection precision setting device 6 supplies a signal set so that a frame synchronizing signal is detected with detection precision lower than the regular detection precision to the frame synchronizing signal detection signal output device 7 because the frame synchronization link is established. At this time, in the frame synchronizing signal detection signal output device 7, the detection precision of a frame synchronizing signal is set to detection precision lower than the regular detection precision, a frame synchronizing signal in the received data is detected with the lower detection precision and the detected frame synchronizing signal is supplied to a control unit not shown in FIG. 1 and others.

The detection precision higher than the regular detection precision in this embodiment means that in the case where the number m of the rows of the shift register is 12, a bit pattern of a frame synchronizing signal in the received data and the specific bit pattern of the frame synchronizing signal stored in the frame synchronizing signal storage 4 are coincident during six or more continuous clock pulses and in the meantime, the detection precision lower than the regular detection precision means that in the case where the number m of the rows of the shift register is 12, a bit pattern of a frame synchronizing signal in the received data and the specific bit pattern of the frame synchronizing signal stored in the frame synchronizing signal storage 4 are coincident during three continuous clock pulses or approximately 3 continuous clock pulses.

As described above, in this embodiment, as the detection precision of a frame synchronizing signal before a frame synchronization link is established is set to a higher value than the regular detection precision and in the meantime, the detection precision of the frame synchronizing signal after the frame synchronization link is established is set to a lower value than the regular detection precision, the establishment of a stable link in which error synchronization is reduced is achieved before the frame synchronization link is established, undetection due to slight noise superimposed on data and disturbance is prevented after the frame synchronization link is established and the ratio of the detection of a frame synchronizing signal is enhanced.

What is claimed is:

1. A frame synchronizing signal detecting method, wherein the method is used in a data multiplexing transmitter-receiver which is provided with a transmitter-receiver that transmits and receives at least a radio-frequency signal, a modulator-demodulator that coverts the radio-frequency signal to a baseband signal and converts the baseband signal to the radio-frequency signal and a baseband signal processor that processes the baseband signal and in which the baseband signal processor is provided with a frame synchronizing signal detector, wherein when a frame synchronizing signal included in received data is detected, the frame synchronizing signal detector sets a detection precision of the frame synchronizing signal before a frame synchronization link is established to a high value and sets the detection precision of the frame synchronizing signal after the frame synchronization link is established to a lower value than the high value, and wherein the frame synchronizing signal detector is provided with a shift register that temporarily stores received data, a frame synchronizing signal storage that stores a frame synchronizing signal, a comparator that detects coincidence of the frame synchronizing signal extracted from the shift register and the frame synchronizing signal output from the frame synchronizing signal storage, a counter that counts a coincidence output of the comparator, a detection precision setting device that sets the detection precision of the frame synchronizing signal to one of the high value and the low value according to a value of the counter and a frame synchronizing signal detection signal output device that detects a frame synchronizing signal from the received data with detection precision set by the detection precision setting device.

* * * * *